United States Patent [19]

Kanzaka

[11] 4,221,026
[45] Sep. 9, 1980

[54] SEPARABLE END STOP OF A SLIDE FASTENER

[75] Inventor: Yoshihiro Kanzaka, Nyuzen, Japan

[73] Assignee: Yoshida Kogyo K. K., Japan

[21] Appl. No.: 45,607

[22] Filed: Jun. 5, 1979

[30] Foreign Application Priority Data

Jun. 15, 1978 [JP] Japan .............................. 53-82601[U]

[51] Int. Cl.² .............................................. A44B 19/00
[52] U.S. Cl. ........................ 24/205.11 R; 24/205.11 F
[58] Field of Search .................. 24/205.11 R, 205.11 F

[56] References Cited

U.S. PATENT DOCUMENTS

| | | | |
|---|---|---|---|
| 2,511,397 | 6/1950 | Day | 24/205.11 R |
| 3,104,438 | 9/1963 | Scarpini | 24/205.11 F |
| 3,280,437 | 10/1966 | Schwendt | 24/205.11 F |
| 4,078,279 | 3/1978 | Heimberger | 24/205.11 R |
| 4,090,279 | 5/1978 | Wasko | 24/205.11 F |
| 4,104,767 | 8/1978 | Warren | 24/205.11 R |
| 4,152,813 | 5/1979 | Heimberger | 24/205.11 R X |

FOREIGN PATENT DOCUMENTS

| | | | |
|---|---|---|---|
| 865131 | 1/1953 | Fed. Rep. of Germany | 24/205.11 R |
| 1333445 | 6/1963 | France | 24/205.11 R |

*Primary Examiner*—Roy D. Frazier
*Assistant Examiner*—Peter A. Aschenbrenner
*Attorney, Agent, or Firm*—Hill, Van Santen, Steadman, Chiara & Simpson

[57] ABSTRACT

An improved separable end stop of a slide fastener with which the slide fastener can be opened very smoothly without the necessity of forcible pulling of the end stop to decoupling. The separable end stop comprises an insert piece with a stud pin implanted thereon and a connector piece with a groove into which the insert piece is inserted and with a guide channel along which the stud pin is led when both pieces are brought into coupling, the free end of the insert piece being shaped as elongated and flat to form a guide surface extending laterally and the connector piece being provided with a projection extending laterally which comes to contact with the guide surface of the insert piece when the insert piece is coupled with the connector piece.

5 Claims, 5 Drawing Figures

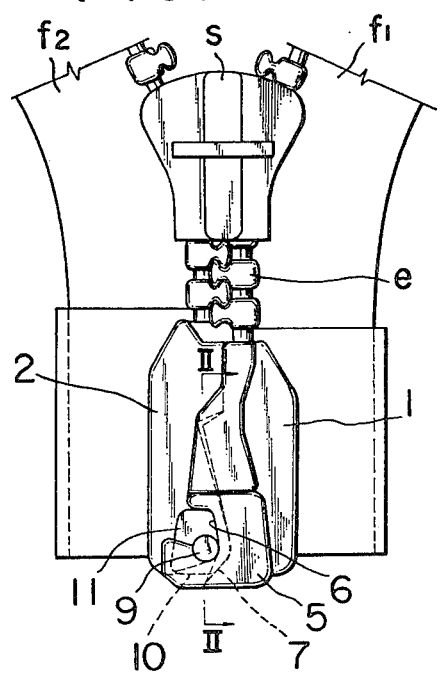
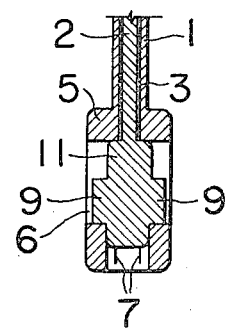
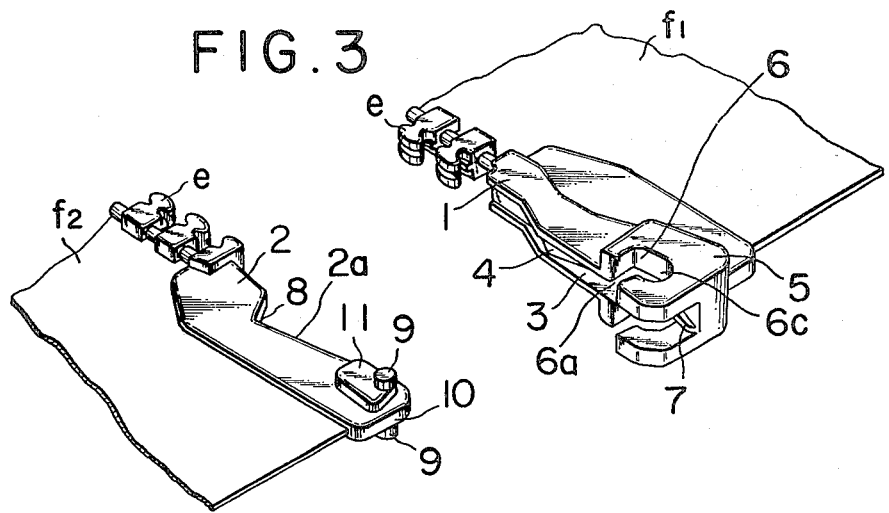

SEPARABLE END STOP OF A SLIDE FASTENER

BACKGROUND OF THE INVENTION

The present invention relates to a novel separable end stop of a slide fastener whereby the slide fastener can be completely separated into right and left fastener stringers. Such a separable end stop of a slide fastener is composed of two pieces, one of which is fastened to the end of one of the stringers and the other of which is fastened to the end of the other one of the stringers in the opposite position to the first piece. The present invention relates, in particular, to a separable end stop of the type comprising a connector piece fastened to the end of one stringer and an insert piece fastened to the end of the other stringer to be inserted into the connector piece when both pieces are coupled to close the slide fastener, the connector piece being provided with an aperture or a guide channel and the insert piece being provided with a pintle or a stud pin implanted thereon and guided along the guide channel in the connector piece when both pieces are brought into coupling.

In one of known separable end stops of the above described type, the guide channel in the connector piece extends obliquely downwardly from the lateral side of the connector piece facing the insert piece and the stud pin on the insert piece is inserted into the bottom of the guide channel whereupon the insert piece is turned around the stud pin to complete the coupling of both pieces. When the insert piece is to be decoupled from the connector piece, the insert piece is turned in the reverse direction around the stud pin at the bottom of the guide channel in the connector piece and the insert piece is pulled out of the connector piece with the stud pin sliding along the guide channel.

One of the problems in the above described separable end stops of the prior art is that, when the insert piece is pulled out of the connector piece, the corner of the insert piece is sometimes caught by the slider, preventing smooth decoupling of the insert piece from the connector piece with the danger of destroying the separable end stop by forcible pulling (see, for example, U.S. Pat. Nos. 3,280,437 and 4,078,279).

SUMMARY OF THE INVENTION

Therefore, the object of the present invention is to provide a novel separable end stop of a slide fastener of the above-described type capable of being handled with ease, especially, in decoupling the insert piece from the connector piece to open the slide fastener with such an improved structure that the stud pin provided on the insert piece can readily come off the guide channel in the connector piece by merely turning the insert piece around the stud pin.

The separable end stop of a slide fastener of the present invention is of the type comprising an insert piece provided with a stud pin and a connector piece provided with a guide channel for the stud pin on the insert piece for coupling and decoupling of both pieces by turning the insert piece around the stud pin, in which the free end of the insert piece remote from the element row is shaped as elongated and flat to form a guide surface perpendicular to the longitudinal direction of the associated element row, the stud pin being positioned inside the guide surface, and the connector piece is provided with a projection in a position outside the guide channel as extending laterally in the direction perpendicular to the longitudinal direction of the stringer and coming into contact with the guide surface in the insert piece.

With the configurations of the connector piece and the insert piece above described, the separable end stop of the invention can readily decoupled into both pieces by merely turning the insert piece whereby the stud pin comes out of the guide channel very smoothly so that advantages are obtained in the easiness of opening the slide fastener as well as in the absence of the danger of destroying the separable end stop by forcible pulling.

BRIEF DESCRIPTION OF THE DRAWINGS

The present invention will now be described by way of example with reference to the accompanying drawings, wherein:

FIG. 1 is a plan view of an example of the inventive separable end stop with the connector piece and the insert piece as coupled;

FIG. 2 is an enlarged cross sectional view of the exemplary inventive separable end stop along the line II—II in FIG. 1;

FIG. 3 is a perspective view of the exemplary inventive separable end stop with the connector piece and the insert piece as decoupled;

DETAILED DESCRIPTION OF THE PREFERRED EMBODIMENTS

Figure 4:
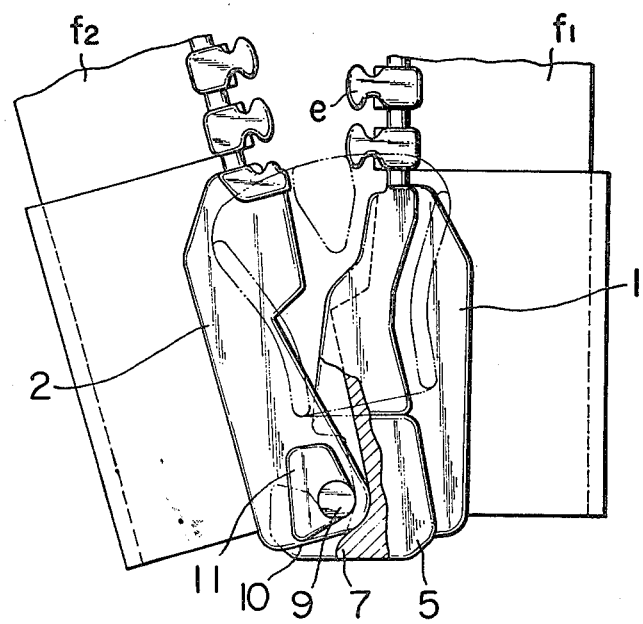
FIG. 4 is a plan view of the exemplary inventive separable end stop showing the beginning stage of the decoupling movement of the insert piece from the connector piece.

In FIG. 1 showing a plan view of the exemplary separable end stop as coupled, the end stop is composed of a connector piece 1 and an insert piece 2, each being fastened to the end of the right stringer $f_1$ or left stringer $f_2$ of a slide fastener capable of being closed or opened by sliding the slider S along the element rows e.

Perspective views of the connector piece 1 and the insert piece 2 as decoupled are shown in FIG. 3. Both pieces are made of a thermoplastic synthetic resin or a metal as manufactured unitarily by injection molding or other suitable techniques. As is shown in FIG. 3, the insert piece 2 flanking the lower end of the stringer $f_2$ is formed with a blade-like portion 2a and two stud pins 9, 9 implanted with intervening stud bases 11, 11 opposite each other on both surfaces of the piece at the position near the lower end of the piece 2. The bottom line, i.e. the free end of the insert piece 2 remote from the element row e, is shaped as elongated and flat to form a guide surface 10 extending laterally in a direction perpendicular to the longitudinal direction of the associated element row e.

The connector piece 1 flanking the other stringer $f_1$ has a larger thickness at the lower portion thereof forming a block-like part 5 and has a groove 3 running longitudinally, into which groove 3 the blade-like portion 2a of the insert piece 2 is inserted. The bottom of the groove 3 is formed so as to match the periphery of the blade-like portion 2a of the insert piece 2. For example, the bottom of the groove 3 as shown in FIG. 3 has a projection 4 and, in correspondence thereto, the periphery of the blade-like portion 2a of the insert piece 2 is recessed at the point 8 although straight line configurations are also possible for the bottom of the groove 3 and periphery of the blade-like portion 2a.

The block part 5 of the connector piece 1 is provided with a guide channel 6 for the stud pins 9, 9 with its open end or mouth 6a facing the insert piece 2. The guide channel 6 extends horizontally from the mouth 6a and then downwardly to form a vertical portion 6c so that a bifurcated hook 5a is formed at the lower end of the block part 5. The width of the groove 3 is larger within the block part 5 so that the insertion of the insert piece 2 into the groove 3 is facilitated even with the larger thickness at the stud bases 11, 11 which come positioned between two legs of the bifurcated hook 5a. In other words, the width of the groove 3 is slightly larger than the thickness of the blade-like portion 2a of the insert piece 2 but the width of the groove 3 within the block part 5 or the distance of the two legs of the bifurcated hook 5a is slightly larger than the overall thickness of the blade-like portion 2a plus two stud bases 11, 11 as is shown in FIG. 2 showing the cross sectional view of both pieces 1 and 2 as coupled.

The bottom of the groove 3 is curved at the lower end thereof in such a manner that a nose-like or flange-like projection 7 is formed as extending laterally in a direction perpendicular to the longitudianl direction of the element row e. When the connector piece 1 and the insert piece 2 are coupled with each other, the projection 7 is positioned outside the guide surface 10 of the insert piece 2 as is shown in FIG. 1.

When the insert piece 2 and the connector piece 1 are coupled with each other to close the fastener, the stud pins 9, 9 are positioned at the bottom end of the guide channel 6 as is shown in FIG. 1 with the uper periphery of the stud pins being positioned somewhat higher than the lower edge of the mouth 6a of the guide channel 6 so as to facilitate insertion of the stud pins 9, 9 into the guide channel 6.

Figure 5:
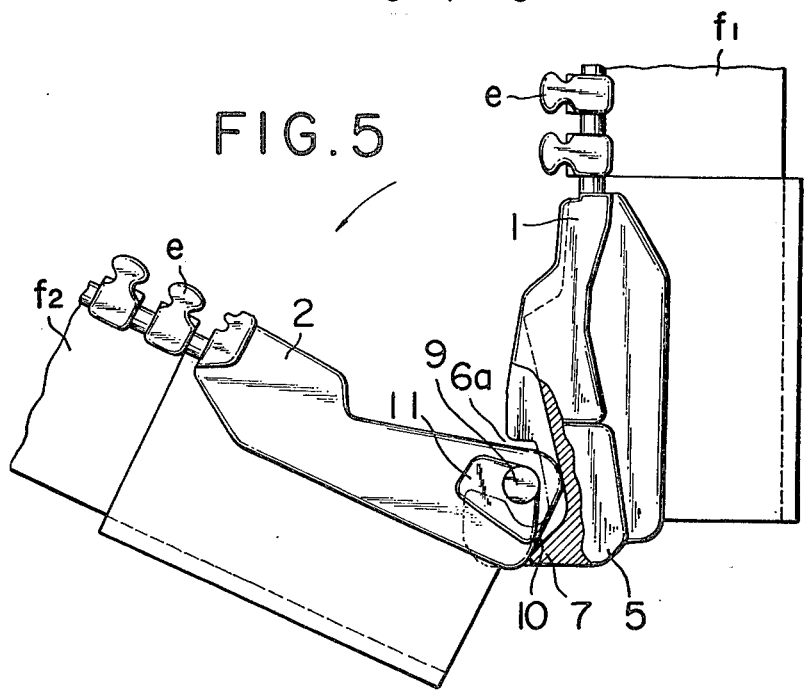
FIG. 5 is a plan view of the exemplary inventive separable end stop showing the final stage of the decoupling movement of the insert piece from the connector piece.

When the insert piece 2 is to be separated from the connector piece 1 to open the slide fastener into the right and left stringers $f_1$ and $f_2$ starting from the coupled state shown in FIG. 1, the slider S is pulled down until it comes into contact with the block part 5 of the connector piece 1 and then the insert piece 2 is turned around the stud pins 9, 9 in such a direction that the upper portions of the insert piece 2 and the connector piece 1 come apart from each other and the insert piece 2 comes off the slider S as is shown in FIG. 4. Upon further turning of the insert piece 2 around the stud pins 9, 9, the end of the projection 7 of the connector piece comes into contact with the guide surface 10 of the insert piece 2 so that the turning of the insert piece 2 thereafter is effected with the contact point of the projection 7 and the guide surface 10 as the fulcrum as is shown in FIG. 5 and the lower corner of the insert piece 2 having been in contact with the connector piece 1 is lifted together with the stud pins 9, 9 which move along an archwise curved line within the guide channel 6 to finally come off the guide channel 6 at the mouth 6a with the slider S still hanging on the stringer half $f_1$. Incidentally, inadvertent pulling of the insert piece 2 toward the element row e is avoided since the stud bases 11, 11 are put in the groove 3 of the connector piece 1 at the portion with larger width in the block part 5 being prevented from the parallel movement in the longitudinal direction by the narrower groove 3 in the upper part of the connector piece 1. Thus reliable turning of the insert piece 2 is ensured at the beginning of the manipulation of the end stop to decoupling.

When the insert piece 2 is to be coupled with the connector piece 1 to close the slide fastener, the stud pins 9, 9 are first put into the guide channel 6 through the mouth 6a until the end of the projection 7 comes into contact with the guide surface 10 and thereafter the insert piece 2 is turned with the contact point between the projection 7 and the guide surface 10 as the fulcrum so that the stud pins 9, 9 are led along the guide channel 6 to the bottom thereof with the upper part of the insert piece 2 being inserted into the groove 3 of the connector piece 1 as well as into the slider S whereupon the slider S can be pulled up to close the slide fastener.

As described above, the decoupling of the insert piece 2 from the connector piece 1 is performed smoothly by merely turning the insert piece 2 not around the stud pins 9, 9 but around the contact point between the end of the projection 7 and the guide surface 10 as the fulcrum so that the stud pins 9, 9 come off the guide channel spontaneously. Therefore, pulling of the insert piece as in the prior art separable end stops with stud pins is unnecessary eliminating the problems of the non-smooth decoupling of the end stop as well as the danger of inadvertent destruction of the end stop per se.

What I claim is:

1. A separable end stop of a slide fastener composed of a pair of separable slide fastener stringers which comprises a connector piece fastened to the end of the element row of one of the stringers and an insert piece fastened to the end of the element row of the other one of the stringers to be inserted into the connector piece when the connector piece and the insert piece are coupled with each other, the free end of the insert piece remote from the element row being shaped as elongated and flat to form a guide surface extending laterally in the direction perpendicular to the longitudinal direction of the associated element row, the insert piece being provided with a stud pin inside the guide surface as implanted thereon, the connector piece being provided with a guide channel for the stud pin and with a projection extending laterally to come into contact with the guide surface of the insert piece when the connector piece and the insert piece are coupled with each other.

2. A separable end stop as claimed in claim 1 wherein the stud pin is implanted on the insert piece with an intervening stud base.

3. A separable end stop as claimed in claim 1 wherein the connector piece is provided with a longitudinal groove extending over the whole length thereof with such a width that the insert piece is inserted thereinto when the connector piece and the insert piece are coupled with each other.

4. A separable end stop as claimed in claim 1 wherein the thickness of the connector piece is larger in a portion near the free end thereof remote from the element row to form a block part.

5. A separable end stop as claimed in claim 3 or 4 wherein the width of the groove within the block part is larger than the overall thickness of the insert piece with the stud base.

* * * * *